United States Patent [19]

Nakano et al.

[11] 3,916,860

[45] Nov. 4, 1975

[54] CARBURETOR HEAT SHIELD APPARATUS

[75] Inventors: Soichi Nakano, Kawagoe; Eiji Taguchi, Tokyo; Yoji Ishii, Kawagoe; Yoshitoku Iizuka, Toda; all of Japan

[73] Assignee: Honda Giken Kogyo Kabushiki Kaisha, Tokyo, Japan

[22] Filed: July 6, 1973

[21] Appl. No.: 377,064

[30] Foreign Application Priority Data
Aug. 10, 1972 Japan.............................. 47-93817

[52] U.S. Cl.... 123/122 R; 123/119 R; 123/123 AC
[51] Int. Cl.² .......................................... F02M 31/00
[58] Field of Search......... 123/32 ST, 32 SP, 32 SA, 123/119 R, 122 R, 122 AA, 122 AB, 122 AC, 127; 261/23 A

[56] References Cited
UNITED STATES PATENTS

| | | | |
|---|---|---|---|
| 1,430,792 | 10/1922 | Brush............................ | 123/122 AC |
| 2,635,597 | 4/1953 | Boyce............................ | 123/119 R |
| 3,382,856 | 5/1968 | McIlray........................ | 123/119 R |
| 3,543,736 | 12/1970 | Suzuki et al.................. | 123/119 R |
| 3,780,715 | 12/1973 | Flitz............................. | 123/122 AB |

*Primary Examiner*—Charles J. Myhre
*Assistant Examiner*—R. H. Lazarus
*Attorney, Agent, or Firm*—Lyon & Lyon

[57] ABSTRACT

An internal combustion engine employs a multiple throat carburetor which supplies a lean mixture to each main chamber and a rich combustible mixture to each auxiliary combustion chamber. Exhaust gases from each main chamber are used to heat the incoming rich mixture to a relatively high degree and to heat the incoming lean mixture to a lesser degree. The intake passage for the incoming lean mixture is placed directly above a chamber in the exhaust passage and is separated therefrom by a first shield in the form of a substantially horizontal metallic plate. A multiple throat carburetor is positioned directly above a chamber in the intake passage for the lean mixture and is separated therefrom by a second shield, substantially horizontal, comprising a metal plate with an upturned peripheral edge.

12 Claims, 2 Drawing Figures

CARBURETOR HEAT SHIELD APPARATUS

This invention relates to internal combustion engines in which a lean mixture is supplied to a main chamber and a rich combustible mixture is supplied to an auxiliary combustion chamber. It is desirable to use the heat of the exhaust gases from the main chamber to heat the incoming rich mixture to a relatively high degree and also to heat the incoming lean mixture to a lesser degree.

However, when the multiple throat carburetor supplying the lean mixture and the rich mixture is placed above the lean mixture heating chamber, and when the latter chamber is placed above the exhaust passage chamber which is in heat exchange relationship with the rich mixture intake, the heat is sufficient under normal engine operation to cause undesirable boiling of the fuel in the carburetor and to develop vapor lock.

In accordance with this invention, a first heat shield is placed between the exhaust passage chamber and the chamber for the lean mixture intake passage, and a second heat shield is placed between the latter chamber and the multiple throat carburetor assembly. The intake passage for the rich mixture has at least a portion thereof enveloped within the exhaust passage so that heating of the rich mixture to prevent fuel condensation is readily achieved. The first heat shield permits only the desired amount of heat to reach the incoming lean mixture, and the second heat shield is effective to minimize transfer of heat to the carburetor, thereby preventing boiling of the fuel and consequent vapor lock.

Other and more detailed objects and advantages will appear hereinafter.

Figure 1:
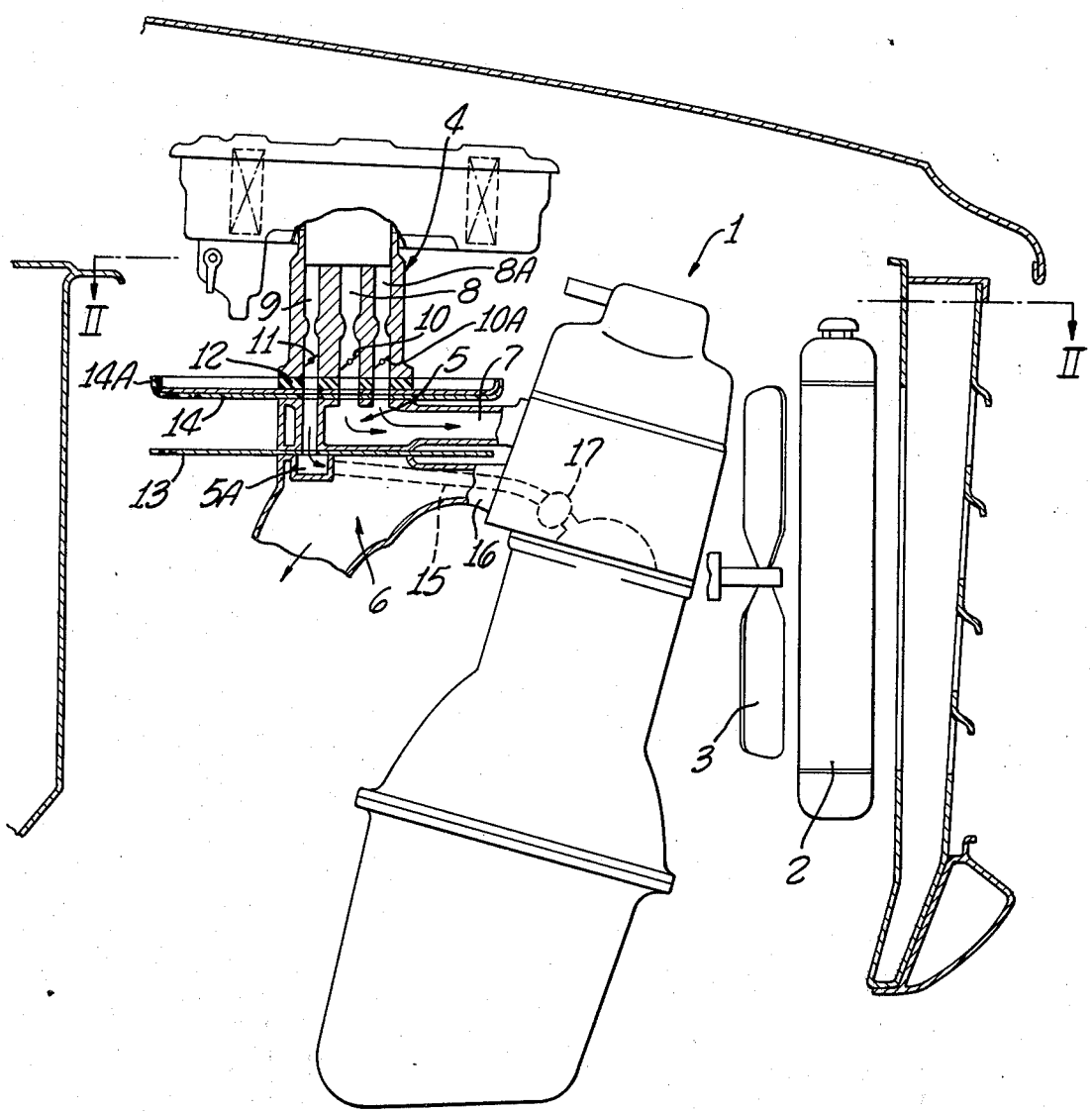
FIG. 1 is a side elevation in diagrammatic form and partly in vertical section showing a preferred embodiment of this invention.
Figure 2:
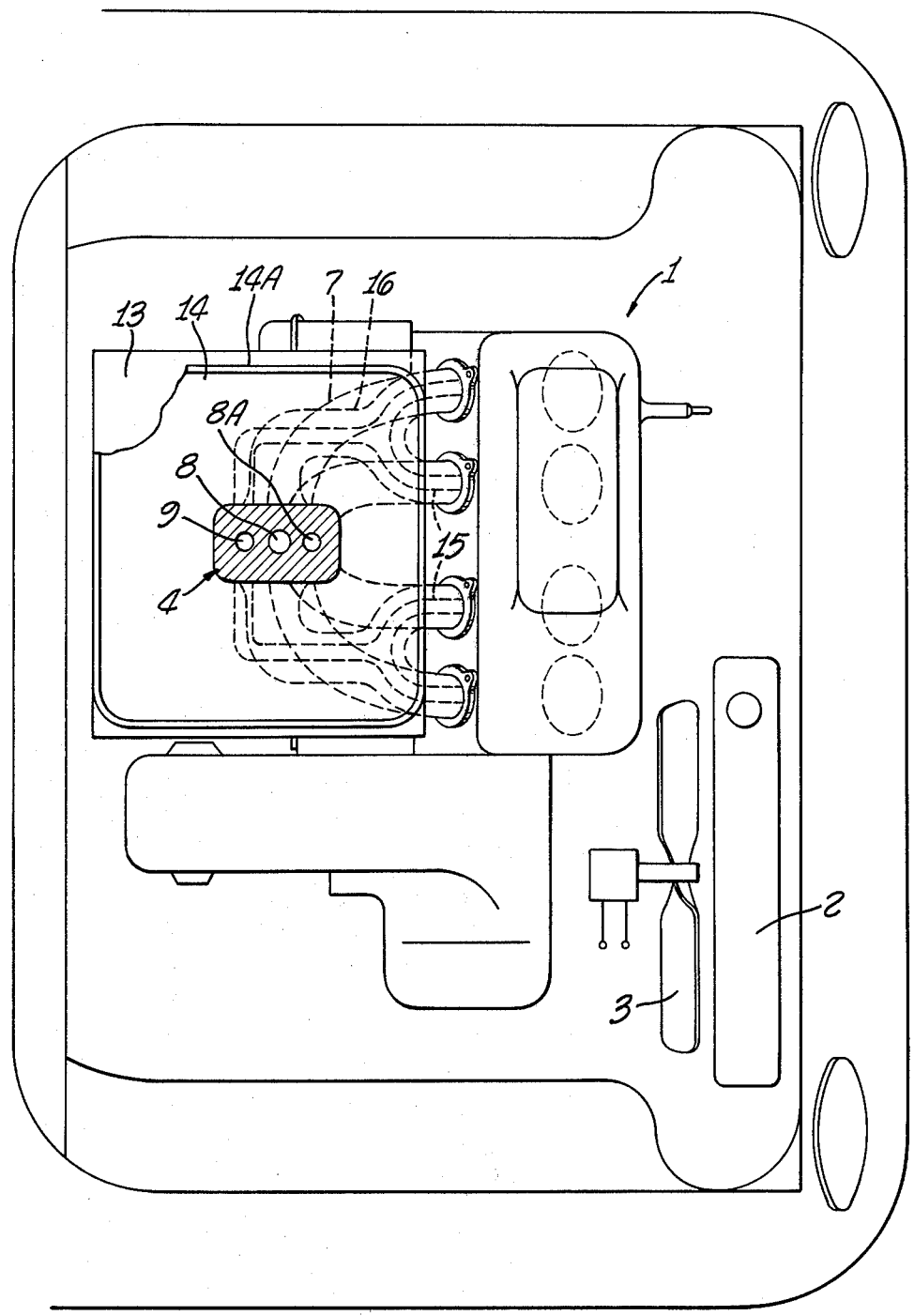
FIG. 2 is a top plan view taken substantially on the lines II—II as shown in FIG. 1.

Referring to the drawings, the four-cylinder internal combustion engine generally designated 1 is installed within the engine compartment of an automobile having a radiator 2 and a cooling fan 3. The carburetor generally designated 4 is positioned above the heating chamber 5 for a lean intake mixture supplied to the main combustion chambers of the engine through intake passage 7. The exhaust gas chamber 6 receives exhaust gases from the main combustion chambers through exhaust passage 16. The chamber 5 is positioned above the chamber 6 and the carburetor 4 is positioned above the chamber 5. Multiple intake passages 8 and 8A of the carburetor 4 deliver a lean mixture to the heating chamber 5 and through the intake passage 7 to the main combustion chambers, not shown, of the engine. Each auxiliary chamber is connected to its respective main combustion chamber through a nozzle, not shown.

At the joint between the intake mixture heating chamber 5 and the exhaust gas chamber 6, a first, substantially horizontal heat shield 13 is placed, extending laterally around the joint. At the joint between the intake mixture heating chamber 5 and the carburetor 4, a second substantially horizontal heat shield 14 is placed extending laterally around that joint. The upper heat shield 14 has an outer periphery in the form of an upturned edge 14A. An insulating plate 12 is inserted between the upper heat shield 14 and the carburetor 4.

Radiant heat from the exhaust gas chamber 6 and the exhaust pipe 16 as well as from the intake mixture heating chamber 5 and intake pipe 7 is shielded by the heat shields 13 and 14 so as to minimize heating of the carburetor 4. Also, ascending air, heated by the exhaust gas chamber 6, is prevented by the lower heat shield 13 from reaching the carburetor 4, and a part of the ascending air that is not completely shielded by the lower heat shield 13, as well as the ascending air heated by the intake mixture heating chamber 5, is prevented by the upper heat shield 14 from reaching the carburetor 4. The upturned edge 14A of the upper heat shield 14 guides the ascending air along said edge so as to further prevent the air from reaching the carburetor 4. In addition, the air flowing through and around the carburetor 4 while the vehicle is in motion is directed by the upper and lower heat shields 14 and 13 to cool the lower part of the carburetor 4. Thus, the carburetor 4 is effectively prevented from overheating by means of the shields 13 and 14.

The throttle valves 10, 10A and 11 may be interconnected for operation in unison.

Having fully described our invention, it is to be understood that we are not to be limited by the details herein set forth but that our invention is of the full scope of the appended claims.

We claim:

1. In an internal combustion engine having a first intake passage for a lean mixture, a second intake passage for a rich mixture, and a third passage for carrying away exhaust gases following combustion of said mixtures, the improvement comprising, in combination: means forming a heating chamber for the first passage, means forming a heating chamber receiving exhaust gases from the third passage, a first heat shield comprising a plate interposed between the latter said chambers and extending outwardly therefrom, beyond the outer boundaries of said heat chamber to deter heat from passing upwardly about said heating chamber, a multiple throat carburetor having at least one throat connected to the heating chamber for the first passage, means placing the second passage in heat exchange relationship with the exhaust chamber, the carburetor having another throat connected to the second passage and a second heat shield comprising a substantially horizontal plate interposed between the carburetor and the heating chamber for the first passage.

2. The combination set forth in claim 1 in which the second heat shield has an upturned peripheral lip.

3. The combination set forth in claim 1 in which an insulating plate is mounted in contact with the plate of the second heat shield.

4. In an internal combustion engine having a first intake passage for a lean mixture, a second intake passage for a rich mixture, and a third passage for carrying away exhaust gases following combustion of said mixtures, the improvement comprising, in combination: a heating chamber for the first passage, an exhaust gas chamber for receiving exhaust gases from the third passage, said heating chamber being positioned above said exhaust gas chamber, and a first plate interposed between said heating chamber and said exhaust gas chamber and extending outwardly therefrom in a substantially horizontal direction beyond the outer boundaries of said heat chamber to deter heat from passing upwardly about said heating chamber, said exhaust gas chamber, said first plate and said heating chamber being in juxtaposition for heating of said heating chamber by the exhaust gases in said exhaust chamber.

5. The combination set forth in claim 4 further including a multiple throat carburetor being positioned above said heating chamber and having at least one throat connected to said heating chamber, and a second plate interposed between said heating chamber and said multiple throat carburetor and extending outwardly therefrom in a substantially horizontal direction to deter heat from passing upwardly about said multiple throat carburetor.

6. The combination set forth in claim 4 further comprising means placing the second passage in heat exchange relationship with said exhaust gas chamber below said first plate, said carburetor having another throat connected to the second passage.

7. The combination set forth in claim 5 further comprising an insulating plate interposed between said second plate and said multiple throat carburetor to deter heat transfer from said heating chamber to said multiple throat carburetor.

8. The combination set forth in claim 5 wherein said second plate has an upturned peripheral lip and said multiple throat carburetor has a throttle valve associated with each throat thereof, said upturned peripheral lip extending to a level below said throttle valves.

9. The combination set forth in claim 5 wherein said multiple throat carburetor is substantially exposed to generally lateral flow of air about the internal combustion engine.

10. In an internal combustion engine having a first intake passage for a lean mixture, a second intake passage for a rich mixture, and a third passage for carrying away exhaust gases following combustion of said mixture, the improvement comprising in combination: a heating chamber for the first passage, an exhaust gas chamber for receiving exhaust gases from the third passageway, said heating chamber being generally above said exhaust gas chamber, a first plate interposed between said heating chamber and said exhaust gas chamber and extending outwardly therefrom in a substantially horizontal direction beyond the outer boundaries of said heat chamber to deter heat from passing upwardly about said heating chamber, a multiple throat carburetor having at least one throat connected to said heating chamber for the first passage and having at least one throat connected to the second passage, and a second plate interposed between said heating chamber and said multiple throat carburetor and extending outwardly therefrom in a substantially horizontal direction to deter heat from passing upwardly about said multiple throat carburetor.

11. In an internal combustion engine having a first intake passage for lean mixture, a second intake passage for a rich mixture, and a third passage for carrying exhaust gases following combustion of said mixtures, the improvement comprising, in combination: a heating chamber for the first passage, an exhaust gas chamber for receiving exhaust gases from the third passage, said heating chamber being generally above said exhaust gas chamber, a first plate interposed between said heating chamber and said exhaust gas chamber and extending outwardly therefrom in a substantially horizontal position beyond the outer boundaries of said heat chamber to deter heat from passing upwardly about said heating chamber, said exhaust gas chamber, said first plate and said heating chamber being held together for heating of said heating chamber by the exhaust gases in said exhaust gas chamber, a multiple throat carburetor having at least one throat connected to said heating chamber and at least one throat connected to the second passage, said multiple throat carburetor being generally about said heating chamber, a second plate interposed between said heating chamber and said multiple throat carburetor and extending outwardly therefrom in a substantially horizontal direction to deter heat from passing upwardly about said multiple throat carburetor, an insulating plate interposed between said second plate and said multiple throat carburetor to deter heat transfer from said heating chamber to said multiple throat carburetor, and means placing the second passage in heat exchange relationship with said exhaust gas chamber below said first plate.

12. The combination set forth in claim 11 wherein said second plate has an upturned peripheral lip and said multiple throat carburetor has a throttle valve associated with each throat thereof, said upturned lip extending to a level below said throttle valves, said multiple throat carburetor being exposed to generally lateral flow of air about the internal combustion engine.

* * * * *

UNITED STATES PATENT OFFICE
CERTIFICATE OF CORRECTION

PATENT NO. : 3,916,860

DATED : November 4, 1975

INVENTOR(S) : SOICHI NAKANO et al

It is certified that error appears in the above-identified patent and that said Letters Patent are hereby corrected as shown below:

In the Abstract, line 3, delete "combustible"

Col. 1, line 6, delete "combustible"

Claim 1, line 39, delete the comma after "therefrom"

Claim 4, last line, insert --gas-- before "chamber"

Signed and Sealed this tenth Day of February 1976

[SEAL]

Attest:

RUTH C. MASON
Attesting Officer

C. MARSHALL DANN
Commissioner of Patents and Trademarks